US012642364B2

(12) United States Patent
Prince

(10) Patent No.: US 12,642,364 B2
(45) Date of Patent: Jun. 2, 2026

(54) PERSONALIZED PILLOW AND/OR MATTRESS SELECTION

(71) Applicant: DREAMWELL, LTD., Doraville, GA (US)

(72) Inventor: Victor Ray Prince, Chamblee, GA (US)

(73) Assignee: DREAMWELL, LTD., Doraville, GA (US)

( * ) Notice: Subject to any disclaimer, the term of this patent is extended or adjusted under 35 U.S.C. 154(b) by 253 days.

(21) Appl. No.: 18/338,694

(22) Filed: Jun. 21, 2023

(65) Prior Publication Data

US 2023/0404286 A1 Dec. 21, 2023

Related U.S. Application Data

(60) Provisional application No. 63/354,072, filed on Jun. 21, 2022.

(51) Int. Cl.
| | |
|---|---|
| *A47C 31/12* | (2006.01) |
| *A47C 27/06* | (2006.01) |
| *A47C 27/20* | (2006.01) |
| *B68G 7/00* | (2006.01) |
| *G06Q 30/0601* | (2023.01) |
| *G06Q 50/04* | (2012.01) |

(52) U.S. Cl.
CPC ............ *A47C 31/123* (2013.01); *A47C 27/06* (2013.01); *A47C 27/20* (2013.01); *B68G 7/00* (2013.01); *G06Q 30/0621* (2013.01); *G06Q 50/04* (2013.01)

(58) Field of Classification Search
CPC ..... A47C 31/123; A47C 27/148; A47C 27/15; G06Q 30/0621; A47G 2009/1018; A47G 9/109; B33Y 80/00
See application file for complete search history.

(56) References Cited

U.S. PATENT DOCUMENTS

| | | | | |
|---|---|---|---|---|
| 5,327,596 | A * | 7/1994 | Wallace | A47C 27/15 |
| | | | | 5/655.7 |
| 6,585,328 | B1 | 7/2003 | Oexman et al. | |
| 9,659,322 | B2 | 5/2017 | Gorjanc et al. | |
| 2007/0086947 | A1* | 4/2007 | Boyd | G06Q 50/10 |
| | | | | 5/636 |

(Continued)

FOREIGN PATENT DOCUMENTS

| | | |
|---|---|---|
| EP | 3649899 A1 | 5/2020 |
| WO | 20180083150 A1 | 5/2018 |

OTHER PUBLICATIONS

International Preliminary Report on Patentability for International Application No. PCT/US2023/025853, Filing Date: Jun. 21, 2023, Date of Mailing: Apr. 25, 2024, 14 pages.

(Continued)

*Primary Examiner* — Fredrick C Conley
(74) *Attorney, Agent, or Firm* — CANTOR COLBURN LLP

(57) ABSTRACT

Processes for personalizing a mattress or pillow for a consumer generally includes analyzing data identifying one or more target areas based on surface temperature and/or pressure on a consumer's existing mattress and additively manufacturing a lattice structure to address the one or more target areas so to provide support, pressure point relief, and/or a desired temperature modulation.

17 Claims, 5 Drawing Sheets

(56) References Cited

U.S. PATENT DOCUMENTS

| | | | | |
|---|---|---|---|---|
| 2007/0238935 A1* | 10/2007 | Boyd | ................... | A47C 31/123 |
| | | | | 600/300 |
| 2008/0097779 A1* | 4/2008 | Rawls-Meehan | ...... | A47C 7/027 |
| | | | | 705/304 |
| 2008/0209641 A1* | 9/2008 | Boyd | ....................... | A47G 9/10 |
| | | | | 5/706 |
| 2010/0317930 A1* | 12/2010 | Oexman | ............. | A47C 31/123 |
| | | | | 600/300 |
| 2013/0144751 A1* | 6/2013 | Gorjanc | ............ | G06Q 30/0631 |
| | | | | 705/26.7 |
| 2016/0244319 A1* | 8/2016 | Habertag | ................. | B68G 9/00 |
| 2017/0224126 A1* | 8/2017 | O'Connell, Jr. | ......... | A47G 9/10 |
| 2020/0205589 A1* | 7/2020 | Ho | ............................ | A61F 5/56 |
| 2022/0053946 A1* | 2/2022 | Kappenman | ......... | A47C 27/148 |
| 2022/0192391 A1* | 6/2022 | Kappenman | ......... | A47C 27/148 |
| 2022/0395109 A1* | 12/2022 | Prince, Jr. | ............. | A47C 27/20 |
| 2023/0139923 A1* | 5/2023 | Anstey | ................ | A47C 27/083 |
| | | | | 5/697 |

OTHER PUBLICATIONS

International Search Report for International Application No. PCT/US2023/025853, Filing Date: Jun. 21, 2023, Date of Mailing: Nov. 10, 2023, 7 pages.

Written Opinion for International Application No. PCT/US2023/025853, Filing Date: Jun. 21, 2023, Date of Mailing: Nov. 10, 2023, 12 pages.

\* cited by examiner

10

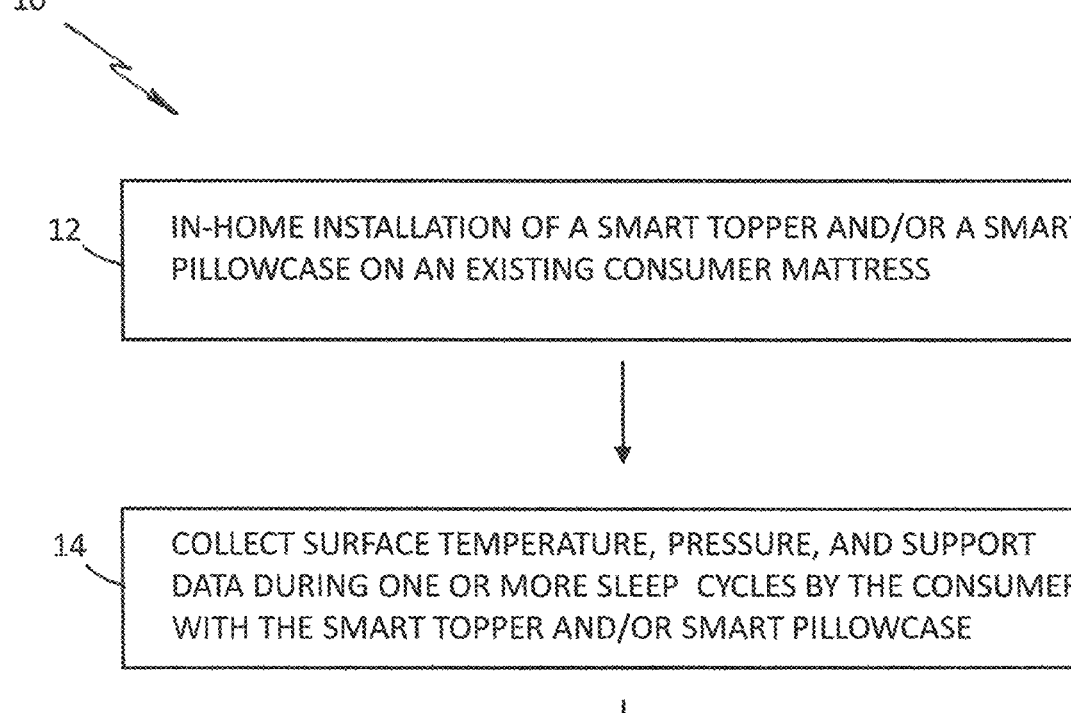

12    IN-HOME INSTALLATION OF A SMART TOPPER AND/OR A SMART PILLOWCASE ON AN EXISTING CONSUMER MATTRESS

14    COLLECT SURFACE TEMPERATURE, PRESSURE, AND SUPPORT DATA DURING ONE OR MORE SLEEP  CYCLES BY THE CONSUMER WITH THE SMART TOPPER AND/OR SMART PILLOWCASE

16    ANALYZE THE DATA BY THE MANUFACTURE/RETAILER TO IDENTIFY TARGET AREAS ASSOCIATED WITH THE SURFACE TEMPERATURE, PRESSURE AND SUPPORT DATA

18    MANUFACTURE A PERSONALIZED MATTRESS ASSEMBLY AND/OR PILLOW BASED ON THE DATA ANALYTICS INCLUDING AN ADDITIVELY MANUFACTURED LATTICE STRUCTURE TO ADDRESS ONE OR MORE TARGET AREAS

22 — RECEIVING DATA RELATED TO A CONSUMER'S MATTRESS PREFERENCES

24 — DETERMING A LATTICE LAYER STRUCTURE BASED ON THE CONSUMER'S MATTRESS PREFERENCES CONFIGURED TO OVERLAY AT LEAST A PORTION OF AN EXISTING MATTRESS

26 — ADDITIVELY MANUFACTURING THE LATTICE STRUCTURE LAYER

28 — OVERLAYING THE ADDITIVELY MANUFACTURED LATTICE STRUCTURE ON OR IN THE EXISTING MATTRESS

500

508

504

506

502

510

600

604

602

700

702

702

PERSONALIZED PILLOW AND/OR MATTRESS SELECTION

CROSS REFERENCE TO RELATED APPLICATIONS

The present application claims the benefit of Provisional Application No. 63/354,072 filed on Jun. 21, 2022, incorporated herein by reference in its entirety.

BACKGROUND

The present disclosure is generally directed to personalized pillow and/or mattress selection processes utilizing data obtained from a smart mattress topper and/or smart pillowcase for fabrication of additively manufactured mattresses or bedding components personalized to the consumer.

Conventional bedding cushioning components such as mattresses, pillows and the like exist as static, homogenous, category-based feel designations dictated by available materials and mass production requirements. Foams, springs, padding, feathers, fibers, combinations thereof, and other traditional fill materials can only vary the feel characteristics to the end user in uniform ways. Traditional designs include the use of material layering, variable surface cut geometry in rare cases, perforations, or additives to target the desired pressure and thermal relief. The overall designs are relatively simple and amenable to manufacturing. Moreover, with respect to certain fill materials such as foam, these materials are known to retain heat and require heat absorption or active cooling materials integrated therein or the use of external devices to dissipate retained heat. Still further, the use of the above materials as bedding components are generally dense materials that can be bulky and/or heavy.

Additive manufacturing (AM) processes, also referred to as three-dimensional printing process generally include a sequential layer by layer build-up of a three-dimensional object of any shape from a design. In a typical AM process, a two-dimensional image of a first layer of a polymeric material is formed, and subsequent layers are then added one by one until such time a three-dimensional article is formed. Typically, the three-dimensional article is fabricated using a computer aided design (CAD) model. A particular type of AM process uses an energy beam, for example, an electron beam or electromagnetic radiation such as a laser beam, to photocatalytically create each layer of the lattice structure in which one or more monomers are polymerized or copolymerized and, where indicated, bonded to the underlying layer.

BRIEF SUMMARY

Disclosed herein are mattress selection processes utilizing additively manufactured for forming one or more bedding components. In one or more embodiments, the mattress selection process by a consumer includes providing a smart mattress topper to the consumer configured to be overlayed on an existing mattress, the smart topper comprising a plurality of sensors configured to measure temperature and/or pressure, and a storage medium and/or data transfer device coupled to the sensors for collecting data generated by the sensors during one or more sleep cycles. The smart mattress topper is overlayed onto a sleeping surface of the existing mattress. The process includes recording surface temperature, pressure, and/or movement data during one or more sleep cycles on the existing mattress by the consumer; and analyzing the data to identify one or more target areas associated with one or more of surface temperature, pressure, or mattress support. A mattress assembly is manufactured including at least one additively manufactured lattice structure provided at a location associated with the one or more target areas, wherein the at least one additively manufactured lattice structure is configured to change a temperature profile, a pressure profile, and/or a support profile at the target area in the mattress assembly relative to the existing mattress.

In another embodiment, a process for customizing an existing mattress includes receiving data related to a consumer's mattress preferences; determining a lattice layer structure configured to overlay at least a portion of an existing mattress based on the consumer's mattress preferences; additively manufacturing the lattice structure layer; and placing the additively manufactured lattice structure layer on or in the existing mattress.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

Example embodiments of the invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements Like numbers refer to like elements throughout, and wherein:

FIG. 1 is a flow chart of an exemplary consumer mattress selection process in accordance with one or more embodiments of the present disclosure;

DETAILED DESCRIPTION

Figure 2:
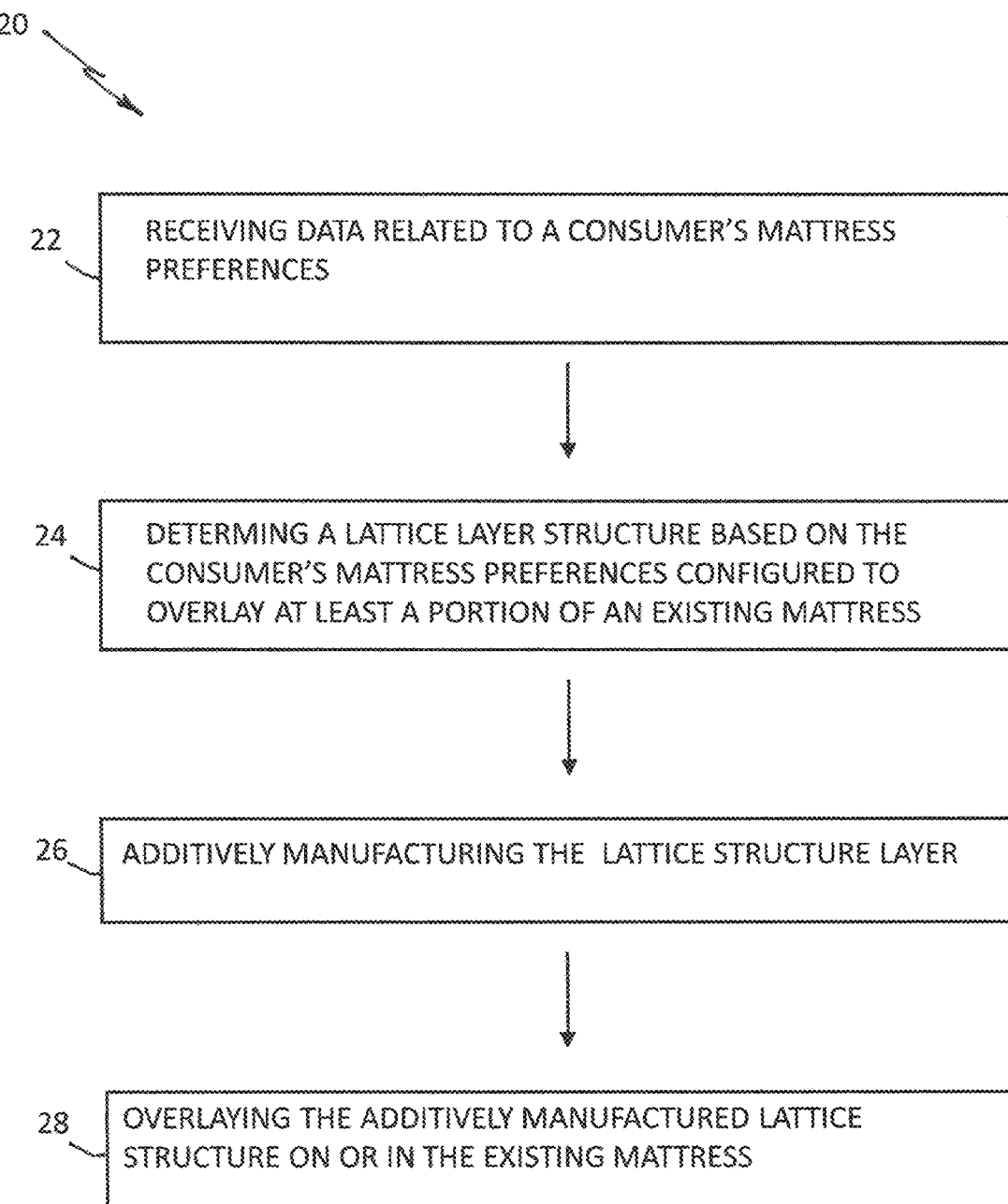
FIG. 2 is a flow chart of an exemplary consumer mattress selection process in accordance with one or more embodiments of the present disclosure.

The present disclosure is generally directed to processes for consumer mattress and/or pillow selection and for customizing an existing mattress. The process for consumer mattress and/or pillow selection generally includes utilizing data as it relates to surface temperature, pressure points, and support obtained from a smart mattress topper and/or smart pillowcase, which is then used for fabrication of an additively manufactured lattice structure for a least a portion of a mattress assembly and/or a pillow assembly. The mattress and/or pillow assemblies formed at least in part by additive manufacturing can include additively manufactured mattress cores, layers, inserts, pillows, or the like, which are personalized to the consumer based on analysis of the data obtained from a smart mattress topper and/or smart pillowcase.

The mattress selection processes generally include providing the consumer with a smart mattress topper and/or a smart pillowcase for in-home use with their existing mattress and pillows. The smart mattress topper and/or smart pillowcase includes a plurality of sensors for measuring temperature and pressure on a surface thereof and are configured to overlay or are fitted to the consumer's existing mattress assembly and/or pillow. For example, if the consumer has a conventional queen size mattress then a queen sized smart topper can be provided and configured to overlay at least a portion of sleeping surface of the queen size mattress. The consumer then sleeps on the existing mattress and/or pillow with the smart topper and/or smart pillowcase thereon for one or more sleep cycles, wherein the sensors in the smart mattress topper and/or smart pillowcase provide information related to surface temperature, consumer movement during a sleep cycle, and/or pressure points. The various sensors in the smart mattress topper and/or smart pillowcase are coupled to a storage medium or a data transfer device for storing and/or transferring data generated from the sensors, which is subsequently provided to and analyzed by the manufacturer or retailer. In one or more embodiments, a mattress assembly and/or pillow assembly is then fabricated based on the data analytics obtained during the consumer's one or more sleep cycles, wherein at least a portion of the mattress assembly and/or the pillow is additively manufactured and configured to address target areas identified by the data analytics specific to the consumer. For example, the consumer may exhibit poor support and pressure points at about a lumbar region with the existing mattress. The mattress selection process can include fabricating a mattress assembly to include an additively manufactured mattress core including a lattice structure configured to provide increased support at the lumbar region to minimize or eliminate pressure points at that location. The additively manufactured lattice structure could also take the form of an insert at the location or as an overlying layer. In this manner, the consumer is provided with a personalized mattress assembly and/or pillow assembly specific to the consumer's data profile as it relates to surface temperature, pressure points, and/or movement during one or more sleep cycles.

A mattress core, a comfort layer, or an insert having a unique lattice-like structure can be additively manufactured to address the targeted areas of the consumer based on the data analytics. For example, data analytics may indicate that the consumer would benefit from increased and/or reduced firmness at certain areas relative to other areas to reduce pressure points observed with the consumer's existing mattress, increased and/or reduced airflow at certain areas relative to other areas to cool or warm the consumer during a sleep cycle, and/or increased and/or reduced support at certain areas relative to other areas to provide a desired level of support about areas where the consumer moves on the mattress during one or more sleep cycles. These targeted areas can be independently addressed with an additively manufactured mattress core, insert or layer by varying the lattice structure. In some embodiments, the targeted areas such as improved temperature control and support may overlap such that the additively manufactured bedding mattress core, layer or insert is configured to provide, for example, both increased/reduced support as well as increased/reduced airflow based on the data analytics associated with the consumer during the one or more sleep cycles. In this manner, the mattress temperature of the consumer can be better regulated to maximize REM sleep. No two consumers are alike in terms of height, weight, gender, physical modalities, sleeping style (e.g., stomach sleeper, side sleeper, back sleeper, etc.) and the like so the resulting mattress assembly including an additively manufactured mattress core, or a layer or an insert and its location will be unique to the consumer based on his/her data analytics.

As another example, a pressure map can be generated from the data collected during one or more sleep cycles by the consumer on the smart mattress topper. The pressure map that is obtained can then be analyzed by the manufacturer/retailer and used to provide a mattress assembly including a particular additively manufactured lattice structure strategically positioned within the mattress assembly and configured to specifically address one or more of the pressure points that may have been observed in the pressure map for that particular consumer during actual in-home sleep cycles. As previously noted, the additively manufactured lattice structure can define the mattress in its entirety, a layer thereof, or one or more inserts. In the case of an additively manufactured mattress in its entirety, the resulting lattice structure can be uniform throughout or variable depending on the data analytics to address the targeted areas, e.g., reduce pressure points by increasing firmness or providing pressure relieving properties at the targeted area to reduce the pressure points. The resulting mattress assembly including an additively manufactured mattress, layer or insert is personalized and unique to the customer resulting in improved comfort and sleep.

In another example, a heat map can be generated from data and inform the manufacturer of hot spots associated with the particular consumer based on the data analytics. The hot spots can be addressed by incorporating additively manufactured building block, i.e., inserts, in targeted areas associated with the hot spots, e.g., the building blocks can include a lattice structure having a higher free volume (areas not occupied by the lattice struts) relative to foam, for example, to increase airflow in the targeted area, thereby reducing the hot spots. Additionally, the additively manufactured mattress, layer or inserts can incorporate thermally conductive materials, phase change materials or the like to address the targeted hot spots during use, which may be independent from or in combination with the additively manufactured lattice structures configured to provide increased air flow. In the case of inserts, the inserts can inserted into a complementary shaped cavity formed at the targeted area within the mattress to provide increased air flow/cooling at the targeted area. For example, many mattress assemblies include one or more foam layers proximate to a sleeping surface. The one or more foam layers can include cavities in which the additively manufactured insert is provided.

In still another example, a map of consumer movement on the mattress during a sleep cycle can be generated to provide data analytics indicative of areas in need of additional support. In this manner, the manufacturer can additively manufacture a mattress or portions thereof with extra support where needed based on the data analytics associated with the particular consumer. Additionally, consumer ingress and egress from the mattress assembly can be tracked and increased support can be provided as desired at the points of ingress and egress assuming consistency by the consumer.

In one or more other embodiments, the process for customizing an existing mattress generally includes receiving data related to a consumer's mattress preferences as it relates to pressure and/or surface temperature. For example, the consumer can be asked a series of questions by the retailer or access an online questionnaire with regard to the consumer's measurements, the consumer's sleeping style, and/or the consumer's mattress preferences. Optionally, the consumer could simply scan a QR code on floor samples in a retail setting, scan a point of purchase code at the retail store or online at a manufacturer's website, and subsequently answer a few questions on the measurements, sleeping style, and preference, which could then be analyzed by the manufacturer to additively manufacture an overlaying layer including a lattice structure for use with the existing mattress. For example, the questions could include queries on whether the existing mattress has soft spots, hot spots, or the like, which can then be matched with an existing additively mattress layer that addresses the target areas defined by the queries as it relates to surface temperature, pressure and support.

An appropriate lattice structure configured to overlay at least a portion of an existing mattress addressing the data input is then determined and additively manufactured, which can then be paced onto or into the existing mattress. As such, the additively manufactured layer can be used as a standalone product for use with the existing mattress. The additively manufactured layer can be used as a top layer to overlay the sleeping surface of the existing mattress and configured with the lattice structure to address one or more target areas deficient in the existing mattress that was identified by data analytics, e.g., the lattice structure layer can be configured to provide increased airflow at the target locations of the existing mattress that previously exhibited a hot spot, increased firmness at the target locations that were too soft and previously resulted in pressure points, and/or provide increased support to minimize movement.

As noted above, the additively manufactured (AM) bedding components can be in the form of resilient three-dimensional polymeric lattice structures. As will be described in greater detail below, the additively manufactured three-dimensional polymeric lattice structures can be used to define pillows, mattress cores, layers, inserts for use in mattresses assemblies. In one or more embodiments, the three-dimensional polymeric lattice structures can be formed using a light activated or thermal additive manufacturing process. The resilient three-dimensional polymeric lattice structure can be varied or constant for an intended application and designed using data obtained from the smart mattress topper and/or smart pillowcase. The data includes pressure, temperature, and movement, which can provide the manufacture with contour maps that can be used to design simple as well as complex three-dimensional lattice structures addressing the targeted areas identified for the particular consumer after one or more sleep cycles.

Exemplary bedding components including the additively manufactured three-dimensional polymeric lattice structure include mattress cores (in whole or in part), pillows, cushions, foam layers, spring layers, mattress toppers, side rails, and the like. Additionally, the bedding components can include formation of inserts including coils of the additively manufactured three-dimensional polymeric lattice structure for insertion into one or more layers defining the particular bedding component to provide zones having different firmness levels, support levels, and/or airflow properties relative to other portions of the one or more layers of a conventional bedding component, for example. The resilient three-dimensional polymeric lattice structures can further include integrated fastening systems that reduce or eliminate the need for secondary fasteners or adhesives. In this manner, additive manufacturing apparatuses that have limitations on the maximum size of the bedding component that can be manufactured can be used to form portions of a bedding component that can subsequently be fastened to one another using the integrated fastening systems to form the bedding component in its entirety.

The light activated polymerization additive manufacturing process is not intended to be limited to any particular process or three-dimensional printing apparatus as known in the art and generally includes exposing a surface of a liquid monomeric or liquid polymeric composition to a radiation source. The liquid monomeric or liquid polymeric composition generally includes one or more monomers or cross-linkable polymer(s) and a photocatalyst (e.g., a polymerization catalyst or a light activated cross linker) in a vessel, which is also generally referred to in the art as a VAT photopolymerization process, to form a first patterned two-dimensional layer of a solidified polymer wherever the activating radiation strikes the surface of the liquid. Once a desired two-dimensional pattern of solidified polymer is formed, a stage supporting the two-dimensional pattern of the solidified polymer first layer is lowered a relatively small distance into the vessel and submerged into the liquid so that a second patterned layer can be formed on the first patterned layer. The process is repeated until the desired three-dimensional resilient lattice structure is formed. In this manner, the AM processes of the present disclosure can be used to directly synthesize polymers into complex geometries, which can be configured to provide a desired level of support, airflow, and minimal weight.

Exemplary and suitable photopolymerization additive manufacturing processes include, without limitation, digital light processing (DLP), stereolithography (SLA), continuous liquid interface production by carbon (CLIP), daylight polymer printing, and the like. For compositions including a photocatalyst (i.e., photoinitiator), the radiation source is not intended to be limited and is generally chosen to provide activating radiation at a particular wavelength or range suitable for photocatalysis or photoinitiation to form the solidified variable density three-dimensional lattice structure layer-by-layer.

The thermal additive manufacturing process, also referred to as powder bed fusion, generally includes providing a powdered layer of polymeric particles, which are then subjected to a selective melting process using heat from a laser energy beam or E-beam or the like to selectively melt a pattern in the powder layer followed by solidifying upon cooling to define a two-dimensional solidified image in the layer. The selective melting process generally includes heating the polymer particles above its glass transition temperature. The energy beam can be caused to move over the powdered layer in a desired pattern to form a melted portion of the layer and define the two-dimensional patterned image in the layer, which is then repeated to form the three-dimensional lattice structure layer by layer. The selective melting process can be conducted in an inert atmosphere, under vacuum, or under a partial vacuum.

The present disclosure is not intended to be limited to any specific monomer or polymer used in the additive manufacturing process. These materials are generally known in the art as well as various photocatalysts and crosslinkers. The resulting three dimensional polymeric lattice structures are generally fabricated with materials to provide resiliency and can be formed of natural or synthetic elastomeric polymers such as, but not limited to, natural rubber, polyisobutylene, polybutadiene, and styrene-butadiene rubber, butyl rubber, polyisoprene, styrene-isoprene rubber, ethylene propylene diene rubber, silicone, polyurethane, polyester-polyether, hydrogenated and non-hydrogenated nitrile rubber, halogen-modified elastomers, fluoroelastomers, and combinations thereof. Similarly, one or more monomers can be selected to form any of the above polymers utilizing well known monomers and catalysts.

Advantageously, relative to conventional manufacturing processes and the multitude of materials used to form the bedding components, the AM process to form the bedding components including a three-dimensional polymeric lattice structure design can result in improved pressure management, improved temperature management, improved air flow circulation, simplified construction of complex geometries not previously attainable, improved weight and density control, fewer raw materials needed resulting in fewer sourcing dependencies, zoned comfort as desired without added manufacturing complexity, and the added capability of including sensors or various combinations thereof to the bedding component as it is being built so as to improve feedback metrics for iterative improvements.

Conventional techniques related to AM processes for forming the three-dimensional bedding components may or may not be described in detail herein. Moreover, the various tasks and process steps described herein can be incorporated into a more comprehensive procedure or process having additional steps or functionality not described in detail herein. In particular, various steps in the additive manufacture of three-dimensional articles are generally well known and so, in the interest of brevity, many conventional steps will only be mentioned briefly herein or will be omitted entirely without providing the well-known process details.

For the purposes of the description hereinafter, the terms "upper", "lower", "top", "bottom", "left," and "right," and derivatives thereof shall relate to the described structures, as they are oriented in the drawing figures. The same numbers in the various figures can refer to the same structural component or part thereof. Additionally, the articles "a" and "an" preceding an element or component are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

Spatially relative terms, e.g., "beneath," "below," "lower," "above," "upper," and the like, can be used herein for ease of description to describe one element or feature's relationship to another element(s) or feature(s) as illustrated in the figures.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like.

It will also be understood that when an element, such as a layer, region, or substrate is referred to as being "on" or "over" another element, it can be directly on the other element or intervening elements can also be present. In contrast, when an element is referred to as being "directly on" or "directly over" another element, there are no intervening elements present, and the element is in contact with another element.

As used herein, the term "sleep cycle" is not intended to be limited to any particular amount of time or duration and is generally defined as a period of time a consumer sleeps on an existing mattress. The term "smart mattress topper" is generally defined as a flexible fabric layer including a plurality of sensors for detecting temperature and/or pressure, wherein the sensors are coupled to a storage medium and/or a data transfer device. The smart mattress topper can be foam- and/or fiber-padded or unpadded. In some embodiments, the smart mattress topper is a fitted sheet having a top surface and sidewall surface including a peripheral elastic band configured to be fitted onto the mattress.

Turning now to FIG. 1, there is shown a flowchart of an exemplary mattress selection process 10. In step 12 a consumer is provided with a smart mattress topper and/or smart pillowcase for use with the consumer's existing mattress assembly and/or pillow. The consumer installs the smart mattress topper onto his/her existing mattress assembly and/or pillowcase. In some instances, the smart mattress topper can be bifurcated and/or two or more pillowcases are provided to the consumer to generate surface temperature, pressure points and support data for two consumers that may utilize the mattress assembly and/or pillows during the one or more sleep cycles.

In step 14, data is collected from the smart topper and/or smart pillowcase during one or more sleep cycles. The smart topper and/or smart pillowcase includes a plurality of sensors configured to detect surface temperature, pressure, and/or movement in a known manner and further includes a storage device and/or a data transfer device coupled to the sensors for recording and/or transferring the data.

In step 16, the data is provided to the manufacturer and/or retailer and analyzed to identify target areas associated with surface temperature, pressure, and support for the consumer.

In step 18, the data analytics are utilized by the manufacturer to additively manufacture a mattress or pillow, a layer, or an insert to address the target areas associated with the consumer's existing mattress. The additively manufactured mattress or layer can include a lattice structure compensating for the targeted areas so as to reduce pressure points, modulate temperature profile across the mattress surface, and/or provide the mattress with improved support based on the consumer's movements during one or more sleep cycles. Similarly, the additively manufactured insert can include a lattice structure and have dimensions for insertion into a complementary shaped cavity of a foam layer at the target areas in a mattress assembly formed of conventional materials.

The data analytics can be utilized to generate obtained pressure contour maps, temperature contour maps, and/or movement contour maps to identify the target areas, which are used to develop three-dimensional computer aided design (CAD) polymeric lattice structures configured to address the target areas obtained from the contour maps. The CAD lattice structures can be modeled to provide a desired density, support, and/or airflow profile by changing, for example, cell size, strut size, and overall geometry so as to minimize the pressure points and/or temperature hot/cold spots and/or provide increased support that was observed using the consumer's existing mattress and/or pillow. In one or more embodiments, the lattice structure can have a variable lattice structure or a constant and uniform lattice structure depending on the intended application and/or data obtained from contour mapping using a conventional bedding component.

The three-dimensional lattice structure (variable or constant), which can include the mattress in its entirety, a layer of a mattress assembly, and/or one or more inserts, is fabricated using the additive manufacturing process and is customized to the consumer's data analytics. By way of example, a vessel containing a liquid photopolymer resin composition is used to form the three-dimensional lattice structure layer-by-layer. A light source, e.g., ultraviolet radiation, is used to harden or cure the resin where required while a platform moves the object being made downwards after each layer is formed. The light source can be applied using, for example, digital light processing to form the two-dimensional image within a given layer. In the DLP process, a digital projector screen is used to flash a single image of each layer across the entire platform at once. Because the projector is a digital screen, the image of each layer is composed of square pixels, resulting in a layer formed from small rectangular bricks called voxels. DLP can achieve faster print times for some parts compared to other processes, as each entire layer is exposed all at once, rather than drawn out with a laser. After completion of each layer to form the three-dimensional bedding component, the vessel is drained, and the bedding component removed. In some applications, a support structure may be utilized that is subsequently removed upon completion of the bedding component. Still further, a blade may be utilized that moves between layers to provide a smooth resin base to build the next layer.

FIG. 2 depicts a flowchart of a process for customizing an existing mattress generally designated by reference numeral 20 in accordance with one or more other embodiments. Instead of a smart topper and/or smart pillowcase, the process as shown in step 22 includes receiving data related to a consumer's mattress preferences, which can be obtained via a questionnaire in a retail setting or online. The consumer mattress preferences can include information on sleeping style, e.g., side sleeper, stomach sleeper, etc, and can also include information related to deficiencies in the consumer's existing mattress, e.g., is the existing mattress too firm, too soft, sleep hot, sleep cold, lack support at the perimeter, etc. Additionally, the consumer's measurements such as weight, height gender, and the like can be input. The particular information is not intended to be limited and is utilized to provide as much information about wants and needs of the consumer as it relates to a mattress.

Figure 3:
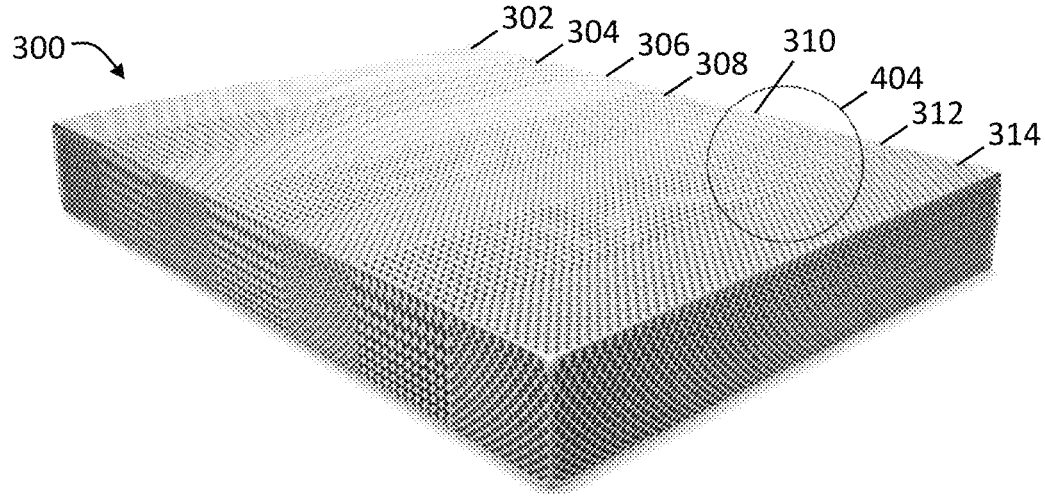
FIG. 3 illustrates a perspective view of an exemplary personalized mattress including a variable lattice structure made by additive manufacturing and produced in the consumer mattress selection process in accordance with the present disclosure.

In step 24, the data is utilized by the retailer and/or manufacturer to determine a lattice layer structure based on the consumers preferences configured to overlay at least a portion of an existing to address the wants and needs of the consumer. In step 26, the lattice structure layer is then additively manufactured, which is then placed on or in the consumer's existing mattress as shown in step 28. In this manner, the consumer can still use its existing mattress and can utilize the additively manufactured lattice layer structure to provide personalized support/pressure relief and/or temperature regulation FIG. 3 illustrates a perspective view of an exemplary additively manufactured mattress core 300 having a rectangular shape including a variable density lattice structure defining multiple zones, 302, 304, 306, 308, 310, 312, 314 that could be produced in the mattress selection process described above. The particular lattice structure is not intended to be limited and can be personalized to the consumer based on the data analytics. By additively manufacturing a mattress core in its entirety, which represents the bulk of the mattress assembly, the mattress assembly be personalized to the consumer unlike the standardized and generic feels provided by conventional mattress assemblies. Additionally, it is noted that traditional mattress assemblies can utilize twenty plus materials per mattress including adhesives and fasteners in its construction whereas the additive manufactured mattress core can be formed from a single material that can be selected to be downcyclable, thereby significantly reducing the environmental impact associated with recycling traditional mattress assemblies, which often require the tear down and separation of the different materials defining the traditional mattress assembly. Moreover, a typical product design cycle for a traditional mattress assembly is about 12 months. In contrast, personalized mattresses that are additively manufactured can be manufactured on demand, with each mattress produced having a different product design for the individual consumer. The additively manufactured mattress can further include a fabric cover encapsulating the additively manufactured mattress. Additionally, the mattress can further include one or more foam layers overlying and/or underlying the additively manufactured mattress. The one or more foam layers can be formed of polyurethane, latex, soy-based poly foams, viscoelastic or non-viscoelastic foams, open cell or closed cell foams, reticulated foams, polyethylene foam, or the like.

Figure 4:
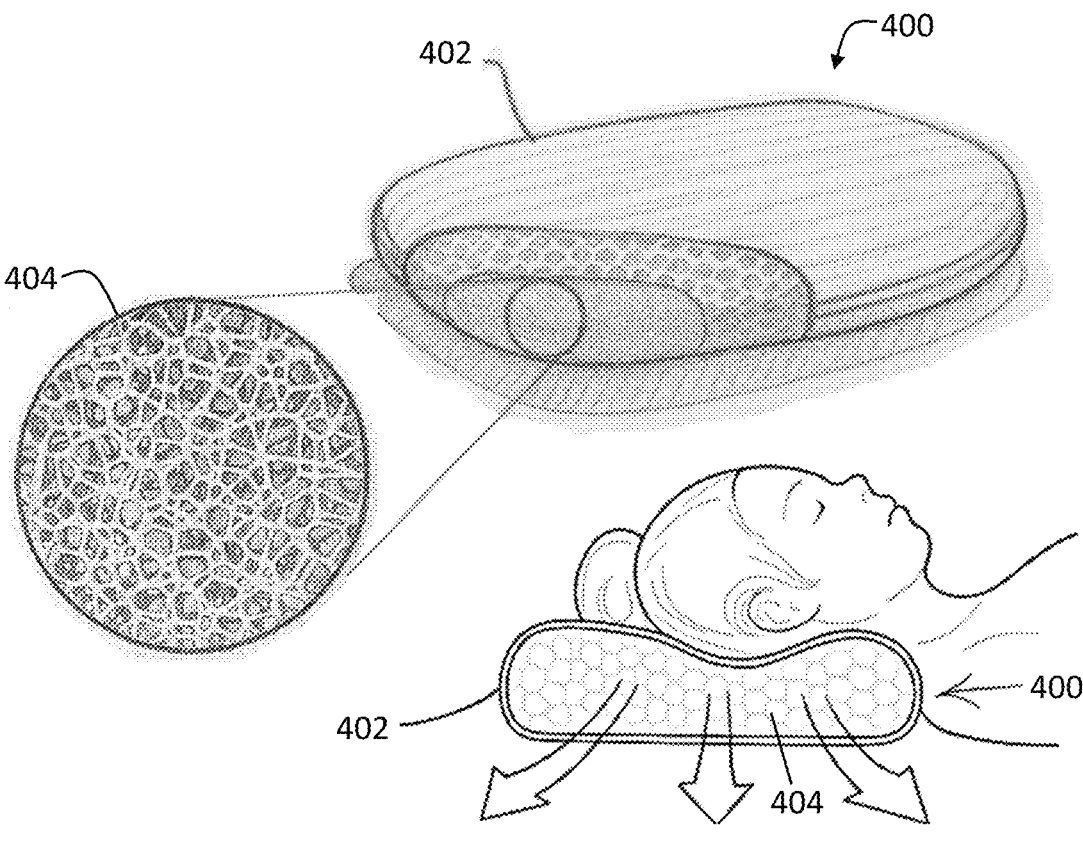
FIG. 4 is a perspective view of a pillow including a variable density polymeric lattice structure made by additive manufacturing and produced in the consumer mattress selection process in accordance with one or more embodiments of the present disclosure.

FIG. 4 illustrates a perspective view of an exemplary pillow 400 made by additive manufacturing including a variable density lattice structure, which can be fabricated based on the data analytics as it relates to temperature, movement, and/or pressure obtained using the smart pillowcase with the consumer's existing pillow. The illustrated variable density lattice structure can include variations in strut diameter, strut shape, and cell diameter to provide different feels in different regions of the pillow to address the target areas identified by the data analytics, e.g., a lattice structure configured to minimize pressure points associated with the consumer, which can take into consideration as to whether the consumer is a side sleeper, back sleeper, or front sleeper. Additionally, because the pillow is in the form of a lattice structure, increased air flow and minimal temperature hot spots can also be considered during the computer assisted design of the pillow.

Figure 5:
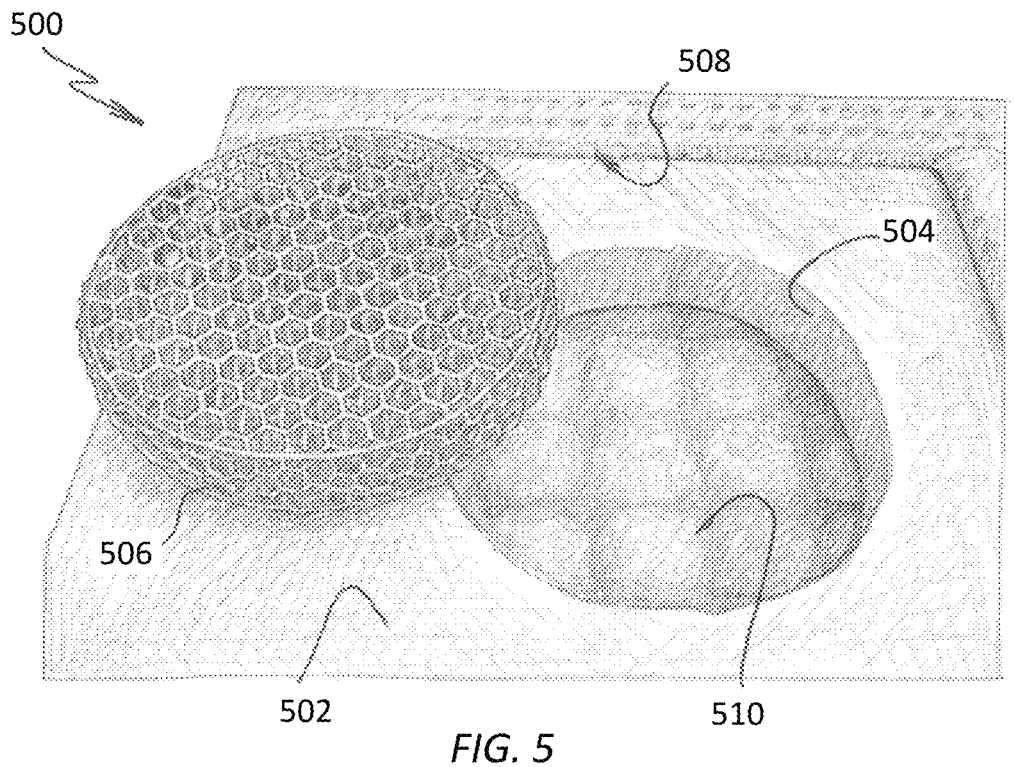
FIG. 5 illustrates a perspective view of a mattress assembly including a cavity configured to receive an insert made by additive manufacturing and produced in the consumer mattress selection process in accordance with one or more embodiments of the present disclosure.

As shown in FIG. 5, the mattress assembly 500 can include a foam layer 502 including an opening 504 dimensioned to accommodate an additively manufactured polymeric lattice insert 506. The opening 504 can be provided at a location consistent with the target area defined by the data analytics for the particular consumer. The opening can extend through the layer in its entirety or be a recessed cavity, wherein relative to a top surface of the foam layer, the insert 506 can be coplanar with the bottom surface or the top surface depending on the intended application. Generally, the cavity depth is substantially equal to a thickness of the insert 506 such that a top surface of the insert is coplanar with the foam layer, although in some embodiments, the cavity depth can be less than or greater than the thickness of the insert so that the insert surface is not coplanar to the foam layer surface. As shown pulled away, a perforated foam layer 408 can overlay the foam layer 502 including the insert 506. Underlying the foam layer 402, there is depicted a conventional mattress core 510 including a plurality of pocketed springs.

The insert 506 is additively manufactured and has a lattice structure and composition effective to address the target areas indicated by the data analytics. For example, the target area provided by the data analytics may be indicative of a hot spot at that particular location. The lattice structure can be configured to increase air flow and/or provide a phase change material, a thermally conductive material, or the like to eliminate and/or minimize heat buildup at the targeted area.

Figure 6:
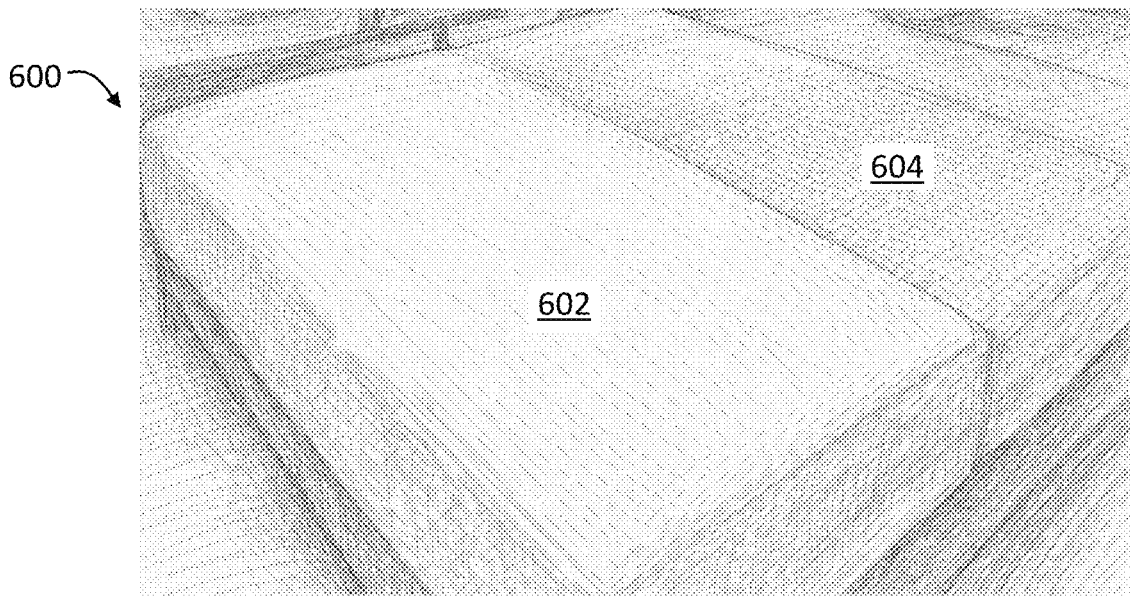
FIG. 6 illustrates a perspective view of a mattress assembly including layer including a portion made by additive manufacturing and produced in the consumer mattress selection process in accordance with one or more embodiments of the present disclosure.

FIG. 6 illustrates a perspective view of a mattress assembly 600 including an uppermost layer including a foam portion 502 and an additively manufactured portion including a lattice structure 504. The additively manufactured portion including a lattice structure 504 is positioned at about a lumbar region, which can provide increased airflow and firmness to the consumer during use thereof.

Figure 7:
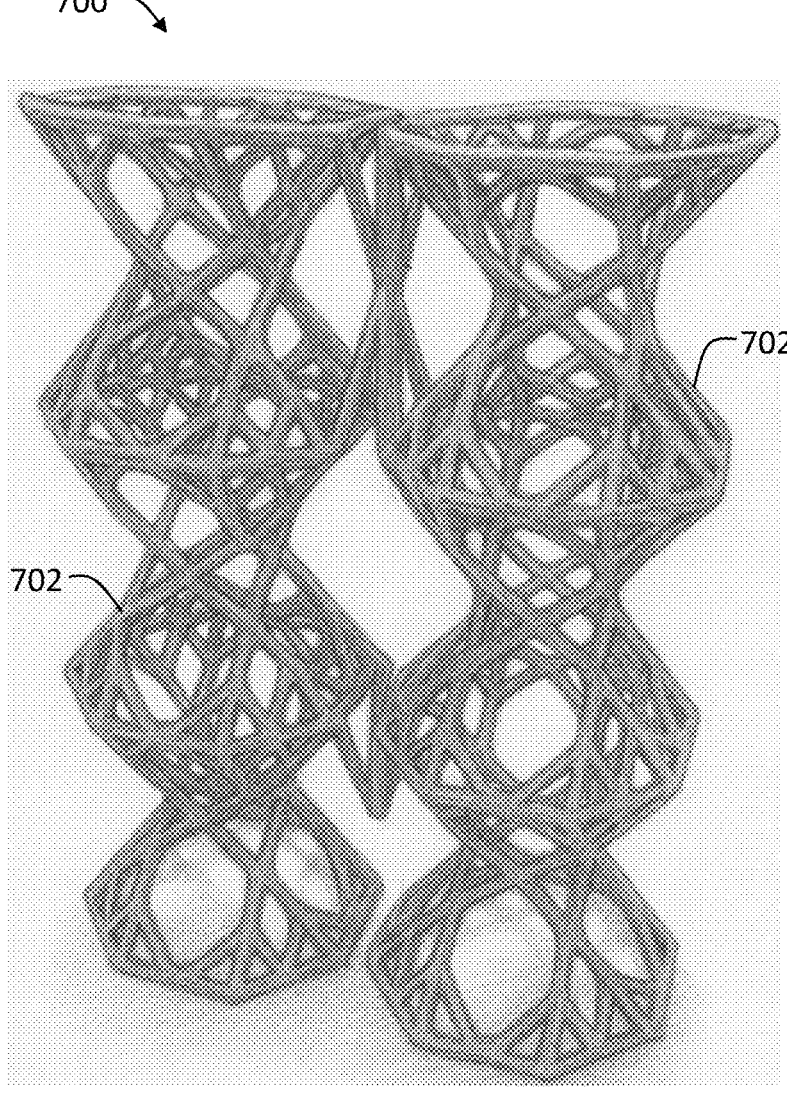
FIG. 7 illustrates perspective views of coil springs made by additive manufacturing and produced in the consumer mattress selection process in accordance with one or more embodiments of the present disclosure.

In one or more embodiments, the additive manufacturing process can be used to fabricate coiled lattice structures 700 such as that shown in FIG. 7. In this manner, steel springs, which are traditionally used in coil spring mattresses can be replaced to provide on-demand variable density design and eliminate the added mattress weight attributed to the use of the steel coils. The coiled lattice structures, two of which are shown, can be configured to provide a linear rate spring, a progressive rate spring, or a combination thereof. The polymeric lattice structures can have a complex or simple shape and can have a constant structure or a variable structure. Likewise, the polymeric lattice coil structures can be tethered to one another at one or more locations along a height dimension of the coils to form a coil string, wherein the tethered portion 702 can be formed using the additive manufacturing process. Using coils of the same polymeric construction as other cushioning components also eases post-processing of the full product at time of disposal and eliminates several of the currently necessary supply chains.

Advantageously, additively manufactured lattice structures prototypes have been fabricated and demonstrated that the theoretical improvements predicted from pressure, movement and temperature mapping are actually observed in product testing. For example, evaporative capacity testing, which evaluates the thermal management properties of a mattress or mattress component, was done on scale mockups of additively manufactured lattice structures and compared to a mock-up with a traditional solid foam block in place of the additively manufactured lattice structures. This testing was also performed on the pillows formed of an additively manufactured lattice structure. In both cases, the components either entirely made up of or using componentry with 3D-printed lattice structures performed markedly better in the comparative thermal analysis; at worst performing 100% better and at best performing 600% better. Moreover, the lattice structure can be selected to provide the bedding component variable firmness and resilience in its entirety or in selective locations within the bedding component as may be desired for different applications.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

What is claimed is:

1. A mattress selection process for a consumer, the process comprising:

providing a smart mattress topper to the consumer configured to be overlayed on an existing mattress, the smart topper comprising a plurality of sensors configured to measure temperature and/or pressure, and a storage medium and/or data transfer device coupled to the sensors for collecting data generated by the sensors during one or more sleep cycles;

overlaying the smart mattress topper onto a sleeping surface of the existing mattress;

recording surface temperature, pressure, and movement data during one or more sleep cycles on the existing mattress by the consumer;

analyzing the data to identify one or more target areas associated with one or more of surface temperature, pressure, or mattress support; and manufacturing a custom mattress assembly for the consumer, the custom mattress assembly including at least one additively manufactured lattice structure provided at a location associated with the one or more target areas discovered during the one or more sleep cycles of the consumer, wherein the at least one additively manufactured lattice structure is configured to change a temperature profile, a pressure profile, and/or a support profile of the consumer at the target area in the mattress assembly relative to the existing mattress.

2. The process of claim 1, wherein analyzing the data to identify the one or more target areas comprises generating contour maps of movement, pressure and/or surface temperature.

3. The process of claim 1, wherein the at least one additively manufactured lattice structure comprises a mattress core, at least a portion of a mattress layer, an insert, and/or a coil structure.

4. The process of claim 1, wherein the at least one additively manufactured lattice structure increases airflow at the target area in the mattress assembly relative to the existing mattress.

5. The process of claim 1, wherein the at least one additively manufactured lattice structure at the target area further comprises a phase change material and/or a thermally conductive material.

6. The process of claim 1, wherein the at least one additively manufactured lattice structure is configured to reduce pressure points observed at the target area in the mattress assembly relative to the existing mattress.

7. The process of claim 1, wherein the at least one additively manufactured lattice structure is configured to increases support at the target area in the mattress assembly relative to the existing mattress.

8. The process of claim 3, wherein the insert is provided in a complementary shaped cavity of a foam layer in the mattress assembly and is positioned at the target area to change a surface temperature profile, a pressure profile, and/or a support profile therein relative to the existing mattress.

9. A process for customizing an existing mattress, the process comprising:

receiving data related to a consumer's mattress preferences, the mattress preferences comprising at least one deficiency in the consumer's existing mattress;

determining a lattice layer structure configured to overlay at least a portion of an existing mattress based on the consumer's mattress preferences, the lattice layer structure customized to mitigate the at least one deficiency in the consumer's existing mattress;

additively manufacturing the lattice structure layer; and placing the additively manufactured lattice structure layer on or in the existing mattress, thereby personalizing at least one characteristic of the existing mattress.

10. The process of claim 9, wherein the consumer's mattress preferences comprises the consumer's measurements and/or the consumer's sleeping style.

11. The process of claim 9, wherein the consumer's mattress preferences comprises relate to support, pressure points and/or temperature.

12. The process of claim 9, wherein the additively manufactured lattice structure layer is configured to overlay an upper most surface of the existing mattress.

13. A pillow selection process for a consumer, the process comprising:

providing a smart pillowcase to the consumer configured to be encapsulate an existing pillow, the smart pillow-case comprising a plurality of sensors configured to measure temperature and/or pressure, and a storage medium and/or data transfer device coupled to the sensors for collecting data generated by the sensors during one or more sleep cycles;

inserting the existing pillow into the smart pillowcase;

recording surface temperature, pressure, and movement data during one or more sleep cycles on the existing pillow of the consumer;

analyzing the data to identify one or more target areas associated with one or more of surface temperature, pressure, or pillow support; and additively manufacturing a custom pillow including a lattice structure configured to change a temperature profile, a pressure profile, and/or a support profile at the one or more target areas discovered during the one or more sleep cycles of the consumer relative to the existing pillow.

14. The pillow selection process of claim 13, wherein analyzing the data comprises generating contour maps of movement, pressure and/or surface temperature to identify the one or more target areas.

15. The pillow selection process of claim 13, wherein changing the temperature profile with the lattice structure comprises increasing air flow.

16. The pillow selection process of claim 13, wherein changing the temperature profile with the lattice structure comprises providing a phase change material and/or a thermally conductive material on the lattice structure.

17. The pillow selection process of claim 13, wherein changing the pressure profile with the lattice structure comprises increasing firmness.

* * * * *